United States Patent [19]

Seitz et al.

[11] 4,325,423
[45] Apr. 20, 1982

[54] PNEUMATIC TIRES, ESPECIALLY BELTED TIRES

[75] Inventors: Hans Seitz, Langenhagen; Heinrich Huinink, Garbsen, both of Fed. Rep. of Germany

[73] Assignee: Continental Gummi-Werke Aktiengesellschaft, Hanover, Fed. Rep. of Germany

[21] Appl. No.: 143,427

[22] Filed: Apr. 24, 1980

[30] Foreign Application Priority Data

Apr. 24, 1979 [DE] Fed. Rep. of Germany ....... 2916445

[51] Int. Cl.³ .......................... B60C 9/22; B29H 17/10
[52] U.S. Cl. .................................. 152/361 R; 156/134
[58] Field of Search .................... 152/361; 156/110 R, 156/123 R, 124, 126, 134

[56] References Cited

U.S. PATENT DOCUMENTS 3,024,829 3/1962 Cooper ............................ 152/361 R
4,202,394 5/1980 Van der Burg .................. 152/361 R

FOREIGN PATENT DOCUMENTS 2821093 11/1979 Fed. Rep. of Germany ... 152/330 R

Primary Examiner—Edward C. Kimlin
Assistant Examiner—Lois E. Boland
Attorney, Agent, or Firm—Becker & Becker, Inc.

[57] ABSTRACT

A belted pneumatic tire having an annular bandage-like reinforcing insert including a cord layer made of pull-resistant threads, strands and the like and extending in the peripheral direction of the tire. The insert extends essentially over the width of the tread between the tread and the carcass. The reinforcing insert includes one or more peripheral segments which are joined together into a ring or annular body having an overlapping area extending at an incline to the peripheral direction of the tire. The overlapping area includes segments rising to the left and right of a center line and joined symmetrically by a V-shaped connection, zig-zag-shaped connection, or wave-shaped connection.

10 Claims, 4 Drawing Figures

PNEUMATIC TIRES, ESPECIALLY BELTED TIRES

The present invention concerns a pneumatic tire, especially a belted tire, having an annular bandage-like reinforcing insert which extends essentially over the width of the tread between the tread and the carcass, especially between the tread and the belt, and which is pull-resistant in the peripheral direction of the tire. The reinforcing insert comprises pull-resistant threads, cords, cables and the like arranged in a cord layer and preferably or essentially extending in the peripheral direction of the tire, whereby this reinforcing insert has one or more peripheral segments which are united or brought together to form a ring or annular body by means of an overlapping area inclined with respect to the peripheral direction of the tire.

These reinforcing inserts, which for finishing or production technical reasons are not embodied as closed annular bodies and have one or more overlapping areas, permit the use of pull-resistant threads, cables, or the like which extend at an extremely acute angle to the peripheral direction of the tire or even extend exactly in the peripheral direction of the tire.

For improving the uniformity of so embodied ring or annular bodies, there are selected slanted overlapping areas which rise at angles of from 30° to 45° to the peripheral direction of the tire. Thus, the abutting point is distributed over a considerable part of the tire periphery. However, such overlapping areas are disadvantageous because during the final forming-out of the raw tire, the reinforcing insert contracts or binds-up in the region of its overlapping, whereby, due to the slant of the overlapping area, a negative influence occurs on the tire belt used in most cases together with the reinforcing insert; thus, an undesired distortion of the belt occurs.

The present invention essentailly has the object to attain a gradual stiffening transition as well as a distortion-free loading of or stress on the connecting area.

This object, and other objects and advantages of the present invention, will appear more clearly from the following specification in connection with the accompanying drawing, in which.

Figure 1:
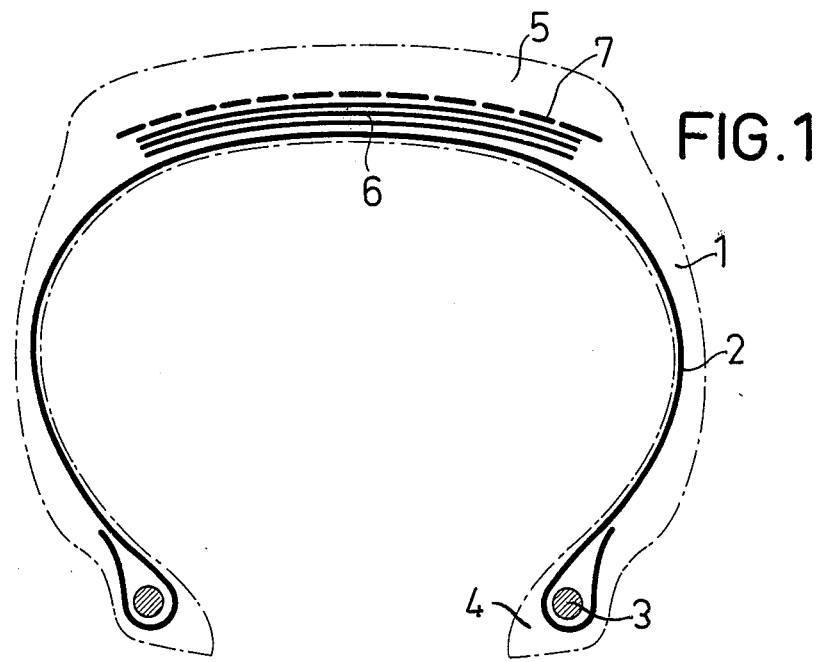
FIG. 1 shows a radial partial section through a belted tire with a radial carcass and a bandage-like reinforcing insert.

The tire of the present invention is characterized primarily in that the overlapping area are provided with segments rising to the left and to the right in at least essentially symmetrical position relative to each other. Preferably, these segments merge directly into each other, for which purpose expediently a V-shaped arrangement is selected, but also a zig-zag shaped or even a wave-shaped embodiment of the overlapping area can be selected.

Expediently, for the slant or inclination of the overlapping areas, or the segments forming the same, angles of approximately from 10° to 50°, preferably angles of approximately from 10° to 30° for the zig-zag configuration, and from 15° to 45° for the V-shaped configuration, are selected so that with an overlapping of up to approximately 30 mm, there results a connecting or overlapping region of approximately from 50 to 120 mm (measured in the peripheral direction of the tire), whereby a considerable shortening of the connecting region is attained as compared with an overlapping area extending only in one slanted or inclined direction. The overlapping area, measured in the peripheral direction of the tire, should range from about 25 to 50% of the standing or engagement surface of the pneumatic tire.

Due to the change in the cutting direction or, in other words, due to the fact that the slanted segments of the connection area rise to the left and to the right, the abutting or connectingregion, i.e. the peripheral extension of the connection area, as seen in the peripheral direction, is considerably shortened. Additionally, there is avoided the aforementioned disadvantageous influence on the strength carriers in the form of the aforementioned belt inserts and located beneath the connecting area.

Referring now to the drawing in detail, the tire body 1, comprising essentially rubber or rubber-like synthetic materials has a radial carcass 2, the strength carriers of which are anchored in the tire beads 4 by being looped around the bead cores 3. Between the tread 5 and the radial carcass 2, there is a pull-resistant belt 6, effecting the lateral stabilization of the tire body, and including two or more cord fabric layers with strength carriers crossing each other; the preferably synthetically arranged strength carriers form angles of approximately 15° to 25° with the peripheral or circumferential direction of the tire. The belt construction, however, is not the subject matter of the invention. The present invention rather, permits different thread and cable arrangements and angle positions.

Closely above the belt 6, there is located a preferably single-layer bandage-like reinforcing insert 7 having strength carriers 8, extending in the peripheral direction of the tire. The reinforcing insert 7 extends over the width of the belt 6 in order, so to speak, to be able to effect the securing or holding thereof. Above the reinforcing insert 7 there is located the tread 5 arranged in a very adhering manner.

Figures 2, 3:
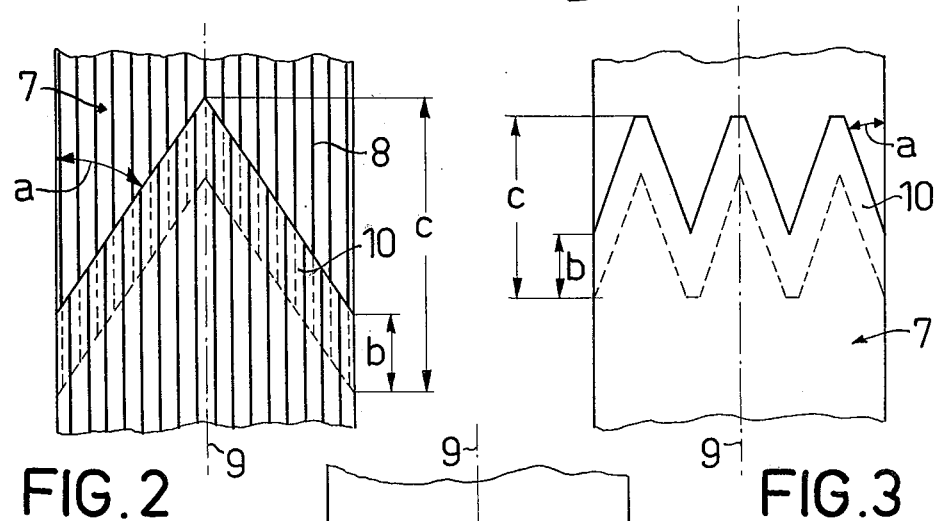
FIG. 2 is a plan view upon the connection area of the reinforcing insert for the tire according to FIG. 1.
FIGS. 3 and 4 each illustrate in plan view modified connection areas while omitting the belt inserts and the carcass located therebeneath.
Figure 4:
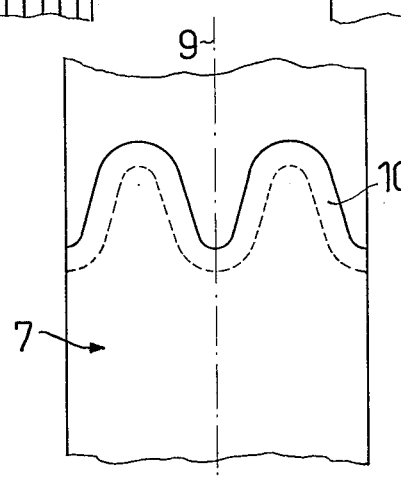

The reinforcing insert 7 is made of a finite length of a cord fabric strip having opposite ends, so that a connection area to join these ends is required, for instance according to FIGS. 2, 3 or 4, to form an endless pull-resistant bandage-type configuration.

According to FIG. 2, the ends of the reinforcing insert 7 are V-shaped, so that there results a V-shaped overlapping area with two segments 10 rising at an incline, which is symmetrical in relation to the center line 9. The angles of inclination or rise "a" of these segments range from 15° to 45°, while the overlapping region "b"—measured in the peripheral direction of the tire—is approximately 25 mm. Consequently, there results a comparatively short length "c" of the connection area in the peripheral direction of the tire, which amounts to approximately 70 to 80 mm and to approximately 30 to 40% of the standing length or length of engagement of the pneumatic tire on the ground contact location. The angle "a" and also the overlapping region "b", however, are variable within the framework of the teaching of the present invention. Overlapping regions of from 5 to 30 mm, and distances of from 50 to 120 mm, or distances of from about 25 to 50% of the length measured in the peripheral direction of the tire of the standing or engagement ellipse of the tire, are possible. The angle of rise or inclination "a" in this case can range from 15° to 45°.

In the embodiment according to FIG. 3, so to speak, a multiple arrangement of the V-shaped overlapping area of FIG. 2 is provided. At an angle "a" of approximately 10° to 30°, the zig-zag path of this overlapping area provides a still shorter distance "c" in comparison to that of FIG. 2, while the overlapping region can essentially correspond to that of FIG. 2.

According to FIG. 4, a wavy path of the overlapping area is provided which likewise is symmetrical with respect to the center line 9.

It is clear that in view of the different inclinations of the segments 10, comparatively short distances "c" are attained. Simultaneously, undesired distortions of the strength carriers adjacent to the reinforcing insert 7 are precluded when diameter changes are necessitated during production of the tire.

The present invention is, of course, in no way limited to the specific disclosure of the specification and drawing, but also encompasses any modifications within the scope of the appended claims.

What I claim is:

1. A pneumatic tire including a belt, having a carcass and a tread, said tire comprising an annular bandage-like reinforcing insert which is pull-resistant in the peripheral direction of said tire, extends essentially over the width of said tread, and is arranged between said tread and said carcass, in position between said tread and said belt, said reinforcing insert including pull-resistant strength carriers in the form of threads, cords, cables, strands, and the like arranged in at least one cord fabric strip and essentially extending in the peripheral direction of said tire, said reinforcing insert having at least one overlapping area constant over the width of said belt and extending at an angle to the peripheral direction of said tire to unite said at least one cord fabric strip into an annular body, said overlapping area including segments inclined to the peripheral direction of said tire on both sides of the center line of said tire in such a way as to be also essentially symmetrical to the center line of said tire both sides of the center line.

2. A tire in combination according to claim 1, in which said overlappin area, when viewed in plan, is V-shaped.

3. A tire in combination according to claim 2, in which said overlapping area is zig-zag shaped.

4. A tire in combination according to claim 1, in which said overlapping area, when viewed in plan, is wave-shaped.

5. A tire in combination according to claim 1, in which the incline of said segments ranges from 10° to 50°.

6. A tire in combination according to claim 5, in which said overlapping area is V-shaped, and said incline ranges from 15° to 45°.

7. A tire in combination according to claim 5, in which said overlapping area is zig-zagged, and said incline ranges from 10° to 30°.

8. A tire in combination according to claim 1, in which said overlapping area, measured in the peripheral direction of said tire, extends from 5 to 30 mm.

9. A tire in combination according to claim 8, in which said overlapping area, measured in the peripheral direction of said tire, stretches over from 50 to 120 mm.

10. A tire in combination according to claim 8, in which said overlapping area, measured in the peripheral direction of said tire, stretches over approximately 25 to 50% of the engagement surface of said tire.

* * * * *